United States Patent
Aoki et al.

(10) Patent No.: US 7,586,894 B2
(45) Date of Patent: Sep. 8, 2009

(54) COMMUNICATION SYSTEM CAPABLE OF SELECTING OPTIMUM GATEWAY FOR TERMINALS

(75) Inventors: Hidenori Aoki, Yokohama (JP); Shinji Takeda, Yokohama (JP); Kengo Yagyu, Yokohama (JP); Narumi Umeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 533 days.

(21) Appl. No.: 11/059,685

(22) Filed: Feb. 17, 2005

(65) Prior Publication Data
US 2005/0195795 A1 Sep. 8, 2005

(30) Foreign Application Priority Data
Feb. 20, 2004 (JP) ............................. 2004-044632

(51) Int. Cl.
*H04J 3/24* (2006.01)
(52) U.S. Cl. .................... 370/349; 370/395.31
(58) Field of Classification Search ................ 370/328, 370/338, 252, 238, 254, 401, 402, 389, 392, 370/237, 370, 395.54, 225–228, 217–220, 370/352–356; 709/241
See application file for complete search history.

(56) References Cited

U.S. PATENT DOCUMENTS

| | | | |
|---|---|---|---|
| 6,104,870 A | | 8/2000 | Frick et al. |
| 6,295,276 B1 * | | 9/2001 | Datta et al. ................. 370/218 |
| 6,775,235 B2 * | | 8/2004 | Datta et al. ................. 370/238 |
| 6,816,706 B1 * | | 11/2004 | Hohnstein et al. ............. 455/25 |
| 6,856,627 B2 * | | 2/2005 | Saleh et al. ................. 370/397 |
| 6,996,086 B2 * | | 2/2006 | Wolfe et al. ................. 370/338 |
| 7,031,288 B2 * | | 4/2006 | Ogier ......................... 370/338 |
| 7,284,057 B2 * | | 10/2007 | Kulkarni et al. ............. 709/227 |
| 2003/0046400 A1 | | 3/2003 | Friel et al. |

FOREIGN PATENT DOCUMENTS

| | | |
|---|---|---|
| EP | 1 324 532 A2 | 7/2003 |
| JP | 11-239154 | 8/1999 |
| JP | 2003-78573 | 3/2003 |
| JP | 2003-230167 | 8/2003 |
| WO | WO 02/098099 A1 | 12/2002 |

(Continued)

OTHER PUBLICATIONS

Black, Uyless D. "TCP/IP and Related Protocols", New York McGraw-Hill Professional, 1998. ISBN: 9780079132826.*

(Continued)

*Primary Examiner*—Kwang B Yao
*Assistant Examiner*—Alex Skripnikov
(74) *Attorney, Agent, or Firm*—Oblon, Spivak, McClelland, Maier & Neustadt, P.C.

(57) ABSTRACT

A communication apparatus is disclosed, which includes an information collection unit, a storage unit, a selection unit, and a route control unit. The information collection unit is configured to collect route information and condition information. The storage unit is configured to store the route information and the connection information. The selection unit is configured to select a connection apparatuses for a terminal apparatus based on the route information and the connection information. The route control unit is configured to control routes from the communication apparatus to the connection apparatus.

11 Claims, 14 Drawing Sheets

FOREIGN PATENT DOCUMENTS

WO     WO 03/079709 A1     9/2003

OTHER PUBLICATIONS

S. Alexander, et al., "DHCP Options and BOOTP Vendor Extensions", RFC 2132, Mar. 1997, 30 pages.

T. Narten, et al., "Neighbor Discovery for IP Version 6 (IPv6)", RFC 2461, Dec. 1998, 82 pages.

S. Knight, et al., "Virtual Router Redundancy Protocol", RFC 2338, Apr. 1998, 27 pages.

* cited by examiner

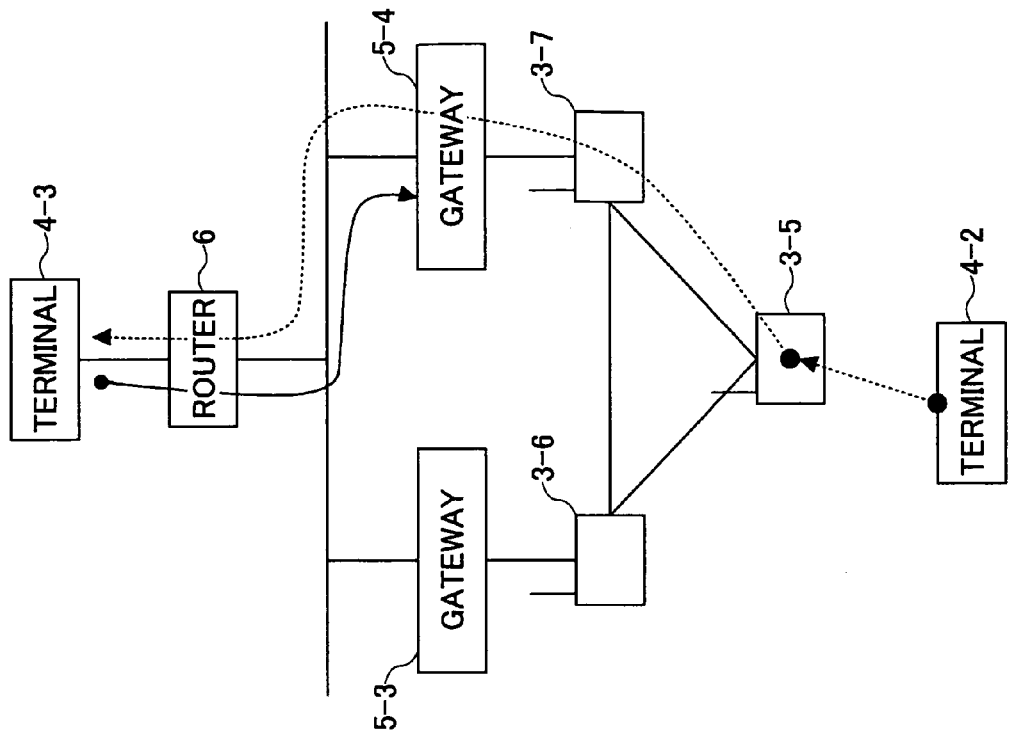
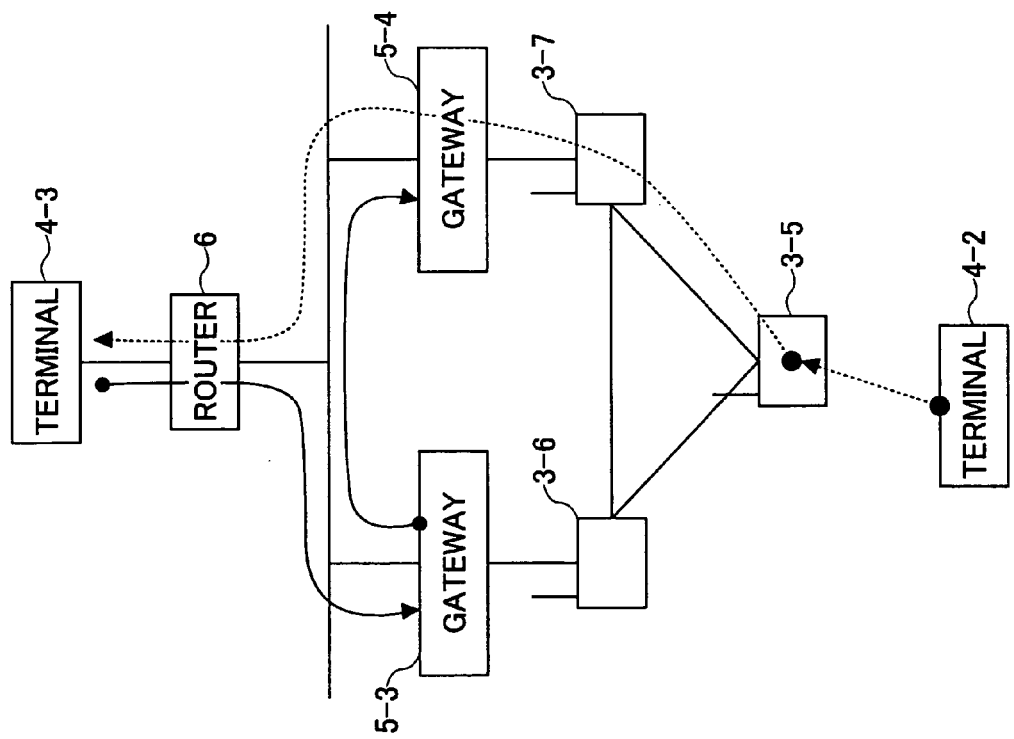

COMMUNICATION SYSTEM CAPABLE OF SELECTING OPTIMUM GATEWAY FOR TERMINALS

BACKGROUND OF THE INVENTION

1. Field of the Invention

The present invention generally relates to a communication apparatus, a relay apparatus, a communication system, and a method for communication, and particularly, to the communication through an ad hoc network comprising multiple communication apparatuses.

2. Description of the Related Art

A wireless LAN can provide faster wireless communication than a mobile telephone network does. Though the communication distance of each wireless station of the wireless LAN is limited, the wireless LAN covers a wide service area using multiple wireless stations connected to a backbone network. The backbone network is generally a wired wideband network such as Ethernet (trademark) that can provide stable communication.

It is desired, however, that the backbone network be extended to an area where a wired network can not be provided easily or that the wireless LAN be quickly established in such an area. In such a case, a wireless backbone network may be employed for connection between the wireless stations of the wireless LAN.

A backbone network based on Ethernet (trademark) operates as a network of data link layer that does not involve an IP router.

When a packet is transmitted from a terminal, the packet is transferred via multiple nodes provided in the backbone network. Many techniques for controlling the route of packet transfer are proposed. The techniques include, for example: spanning tree method defined in IEEE 802.1; routing information protocol (RIP) and open shortest path first (OSPF) used for the routing in the Internet; dynamic source routing (DSR) and ad hoc on demand distance vector (AODV) used for an ad hoc network.

A data link layer network is used as a network that serves relatively small area such as an office or a home. If communication with an external network is needed, the data link layer network may be connected with the external network by a gateway such as an IP router.

When a terminal connected to the backbone network communicates with an external network, the terminal needs to obtain information such as the address of the gateway by any means.

The user of the terminal may input gateway address given by a network administrator manually. However, any change in the condition of the network such as the move of the terminal and/or communication troubles in the network may necessitate the user to re-input the gateway address, which is troublesome and may cause an error. Thus, many techniques are proposed that can automatically set the gateway address to the terminal to solve the above problem.

For example, S. Alexander et al., "DHCP Options and BOOTP Vendor Extensions", RFC 2132, March 1997, proposes the enhancement of DHCP (Dynamic Host Configuration Protocol) in which a terminal is automatically informed of the IP address of a gateway.

T. Narten et al., "Neighbor Discovery for IP Version 6 (IPv6)", RFC 2461, December 1998, proposes an IP router that automatically broadcasts its IP address to the network.

S. Knight et al., "Virtual Router Redundancy Protocol", RFC 2338, April 1998, proposes a technique in which multiple routers share the same IP address as a group and are configured to exchange information with each other. A terminal can use any one of the routers as a gateway without changing the IP address set thereto.

However, the following problems remain unsolved. When the gateway address is set, the condition of routes between the terminal and the gateway is not taken into consideration.

If there is only a single gateway provided in the LAN, the terminal has no choice but select the single gateway. If multiple gateways exist in the LAN, the terminal can select one of them, but communication quality may considerably vary gateway by gateway.

Especially, if the components of the LAN are connected via wireless channels, frequency resource and wireless transmission speed are limited. Consequently, each route between the terminal and a gateway may differ in communication quality. The terminal may select a route the communication quality of which is not satisfactory.

SUMMARY OF THE INVENTION

Accordingly, it is an object of the present invention to provide a novel and useful communication apparatus, relay apparatus, communication system, and a method for communication. Another and more specific object of the present invention is to allow the setting of gateway address to take the condition of a route between a terminal and a gateway into consideration.

To achieve at least one of the above problems, a communication apparatus, includes:

an information collection unit configured to collect route information indicating routes connecting the communication apparatus and a plurality of connection apparatuses, and condition information indicating the condition of the plurality of connection apparatuses, each connection apparatus connecting a first network and a second network, the first network formed by the communication apparatus and other communication apparatuses distributed therein;

a storage unit configured to store the route information and the connection information collected by the information collection unit;

a selection unit configured to select one of the plurality of connection apparatuses for a terminal apparatus having no capability of route control based on the route information and the connection information stored in the storage unit; and a route control unit configured to control routes from the communication apparatus to the one of the plurality of connection apparatuses selected by the selection unit.

The route information and the condition information are collected by the information collection unit and stored in the storage unit. The route information indicates the routes from the communication apparatus to the multiple connection apparatuses, and the condition information indicates the condition of the multiple connection apparatuses. A connection apparatus which is suitable for a terminal apparatus by the selection unit.

Other objects, features, and advantages of the present invention will become more apparent from the following detailed description when read in conjunction with the accompanying drawings.

BRIEF DESCRIPTION OF THE DRAWINGS

FIG. 8A is a schematic diagram for explaining the selection of the most appropriate gateway for a downstream packet performed by a communication system according to a communication system in which gateways exchange a packet according to a second embodiment of the present invention;

FIG. 8B is a schematic diagram for explaining the selection of the most appropriate gateway for a downstream packet performed by a communication system according to a communication system in which a upper rank node selects an appropriate gateway according to a second embodiment of the present invention;

DETAILED DESCRIPTION OF THE PREFERRED EMBODIMENTS

Figure 1:
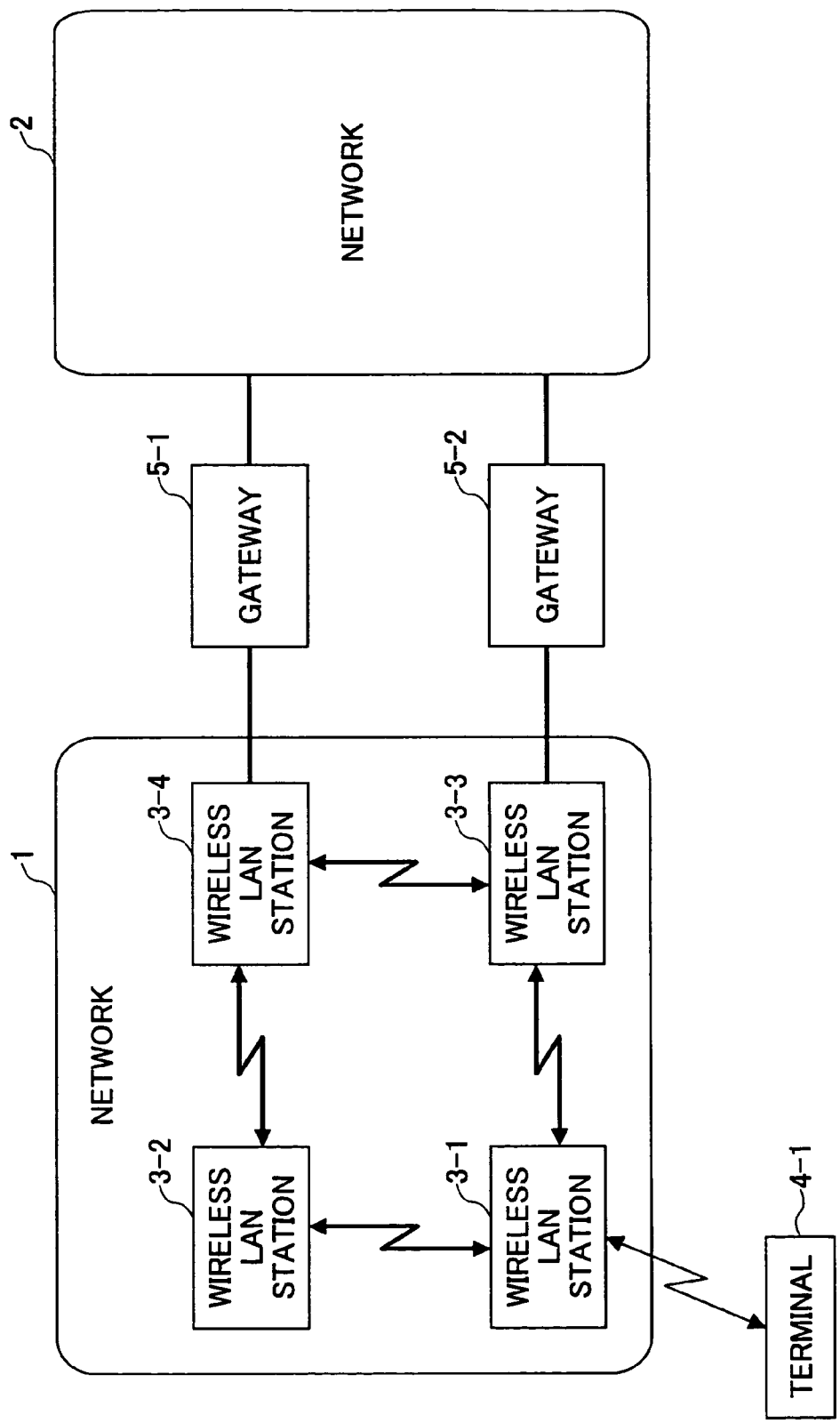
FIG. 1 is a block diagram for explaining a communication system according to a first embodiment of the present invention.

The preferred embodiments of the present invention are described in detail with reference to the drawings. The same elements and/or steps are referred to by the same reference numeral throughout the drawings, and their description are not given twice.

A communication system according to an embodiment of the present invention is described below with reference to FIG. 1.

A communication system according to the present embodiment includes a network 1 in which wireless LAN stations 3-1 through 3-4 are provided. The network 1 is connected with another network 2 via gateways 5-1 and 5-2. A wireless LAN terminal 4-1 can communicate with the network 1 by air. The wireless LAN stations 3-1 through 3-4 operate as communication apparatuses for controlling routes in the network 1. The wireless LAN terminal 4-1 may not have functionality for controlling routes in the network 1.

The wireless LAN stations 3-1 through 3-4 can be connected with each other by air. The wireless LAN station 3-4 is connected with a gateway 5-1 by air, and the wireless LAN station 3-3 is connected with a gateway 5-2 by air. As described above, the wireless LAN stations 3-1 through 3-4 form a mesh network.

A description is given on a mesh network below. A mesh network of wireless LAN stations (Access Points) is formed by multiple access points mutually connected by wireless channels forming one subnet. The access points in a mesh network transfers a packet received from the wireless LAN terminal as if bucket brigade (routing). The principle of a mesh network is basically the same as that of IP routing, but different in that the wireless LAN stations are divided into a layer of wireless LAN stations that are involved in the control of routes and a layer of wireless LAN stations that are not involved in the routing. The wireless LAN terminal can not know how the access points are connected to each other. Additionally, since the access points are connected by air, the quality of connection differs route by route. The route control of the mesh network is performed in layer 2.

It should be understood by those skilled in the art that, in the following description, all wireless LAN stations are connected by air, but some of the wireless LAN stations may be connected by wired channels. Additionally, the connection between a gateway and a wireless LAN station and/or the connection between gateways are wireless (by air), but may be wired.

The structure of wireless LAN station is described below with reference to FIG. 2. Although the wireless LAN station 3-1 is described below, the other wireless LAN stations 3-2 through 3-4 are structured in the same manner.

Figure 2:
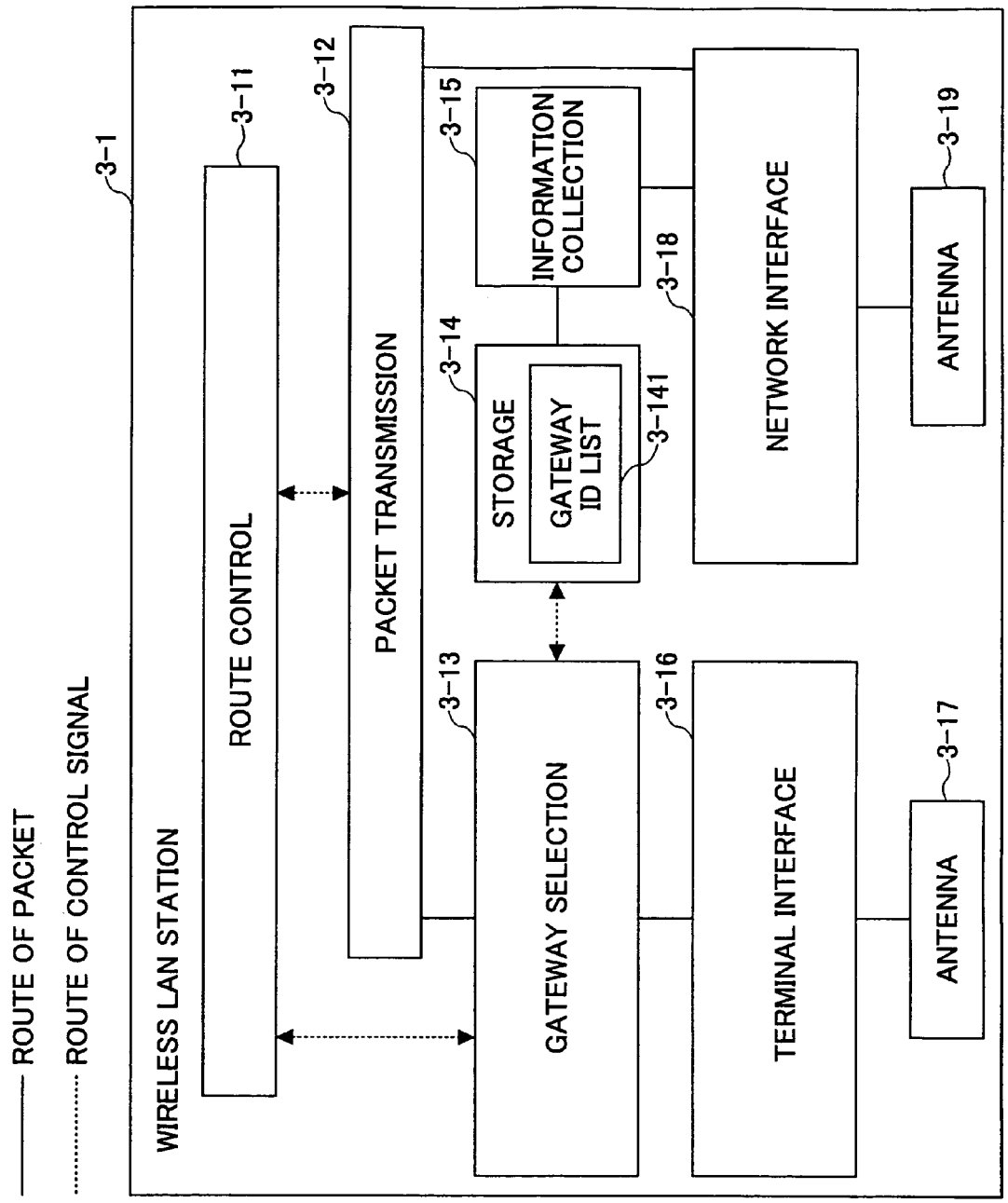
FIG. 2 is a block diagram for explaining a wireless LAN station according to an embodiment of the present invention.

As shown in FIG. 2, the wireless LAN station 3-1 includes a route control unit 3-11 and a packet transmission unit 3-12 connected to the route control unit 3-11. The wireless LAN station 3-1 further includes a gateway selection unit 3-13 connected to the route control unit 3-11 and the packet transmission unit 3-12, a terminal interface 3-16 connected to the gateway selection unit 3-13, and an antenna 3-17 connected to the terminal interface 3-16. The wireless LAN station 3-1 further includes a storage unit 3-14 connected to the gateway selection unit 3-13 and an information collection unit 3-15 connected to the storage unit 3-14. A gateway ID list is provided in the storage unit 3-14. The wireless LAN station 3-1 yet further includes a network interface 3-18 connected to the packet transmission unit 3-12 and the information collection unit 3-15, and an antenna 3-19 connected to the network interface unit 3-18.

The information collection unit 3-15 collects information such as identifiers of the gateways 5-1 and 5-2 connected to the network 1 via the network interface 3-18 and the antenna 3-19. The collected information is stored in the gateway ID list 3-141 of the storage unit 3-14.

The wireless LAN terminal 4-1 does not have functionality for controlling routes in the network 1. The wireless LAN terminal 4-1 transmits a data packet via a wireless LAN station such as the wireless LAN station 3-1. The data packet transmitted by the terminal 4-1 is received by the antenna 3-17 of the wireless LAN station 3-1, and transferred to the gateway selection unit 3-13 via the terminal interface 3-16. In response to receipt of the data packet by the gateway selection unit 3-13, the information such as gateway identifiers stored in the storage unit 3-14 is retrieved into the gateway selection unit 3-13. The gateway selection unit 3-13 selects the optimum gateway under its control for the terminal 4-1 based on the information retrieved from the storage unit 3-14. The route control unit 3-11 controls routes through which the data packet is transmitted to the optimum gateway selected by the gateway selection unit 3-13. The packet transmission unit 3-12 transmits the data packet to the selected gateway.

The transmission of a data packet by a wireless LAN station is further described below.

The wireless LAN stations 3-1 through 3-4 obtains (collect) the identifiers of the gateways 5-1 and 5-2 connected to the network 1. The identifier of a gateway includes, for example, the MAC (Media Access Control) address, IP address, or a combination thereof. The wireless LAN stations can collect any one of the above identifiers.

Additionally, the wireless LAN stations 3-1 through 3-4 can collect the identifiers in the following way. (1) The administrator of the wireless LAN station inputs the gateway identifiers manually. (2) The wireless LAN station obtains the gateway identifiers from an apparatus that manages the gateway identifiers. (3) The gateways 5-1 and 5-2 broadcast their identifiers using a Router Advertisement packet defined in IPv6 (Internet Protocol Version 6), for example, thereby to inform the wireless LAN stations of their identifiers.

In the second (2) case, the apparatus that manages the gateway identifiers may be operated as a DHCP server in parallel so that the wireless LAN stations can obtain their own IP addresses as well as the list of IP addresses of the gateways as the gateway identifiers. In such a case, the access points may inform the DHCP server of the optimal gateway for each terminal and the terminal's identifier. According to the above arrangements, the DHCP server can designate the optimal gateway for each terminal.

In the third (3) case, the wireless LAN station, instead of the gateway, can transmit a router solicitation packet, for example, for collecting the gateway identifiers.

The wireless LAN stations 3-1 through 3-4 determines which gateway is optimum for the terminal 4-1 based on the collected information on the gateways. Specifically, the optimum gateway is determined based on the state of the gateways and the state of routes between the wireless LAN station and the gateway.

The state of a gateway includes the bandwidth between the gateway and an external network such as the network 2, the stability of communication (wireless or wired) with the external network, quality of service (QoS), the traffic on the channel to the external network. Such information can be collected in various ways. For example, the administrator of the wireless LAN station can set the information manually to the wireless LAN station. The wireless LAN station may be obtain such information from the gateway directly, or from a particular apparatus managing the state of the gateway. The wireless LAN station may collect such information when it collect the gateway identifiers.

The state of a route between a wireless LAN station and a gateway includes the number of hops, bandwidth, QoS, the traffic on the route. Such information can be obtained from the route control unit 3-11 that determines a route between the wireless LAN station and the gateway. The wireless LAN station may collect such information when searching for the gateway.

Figure 3:
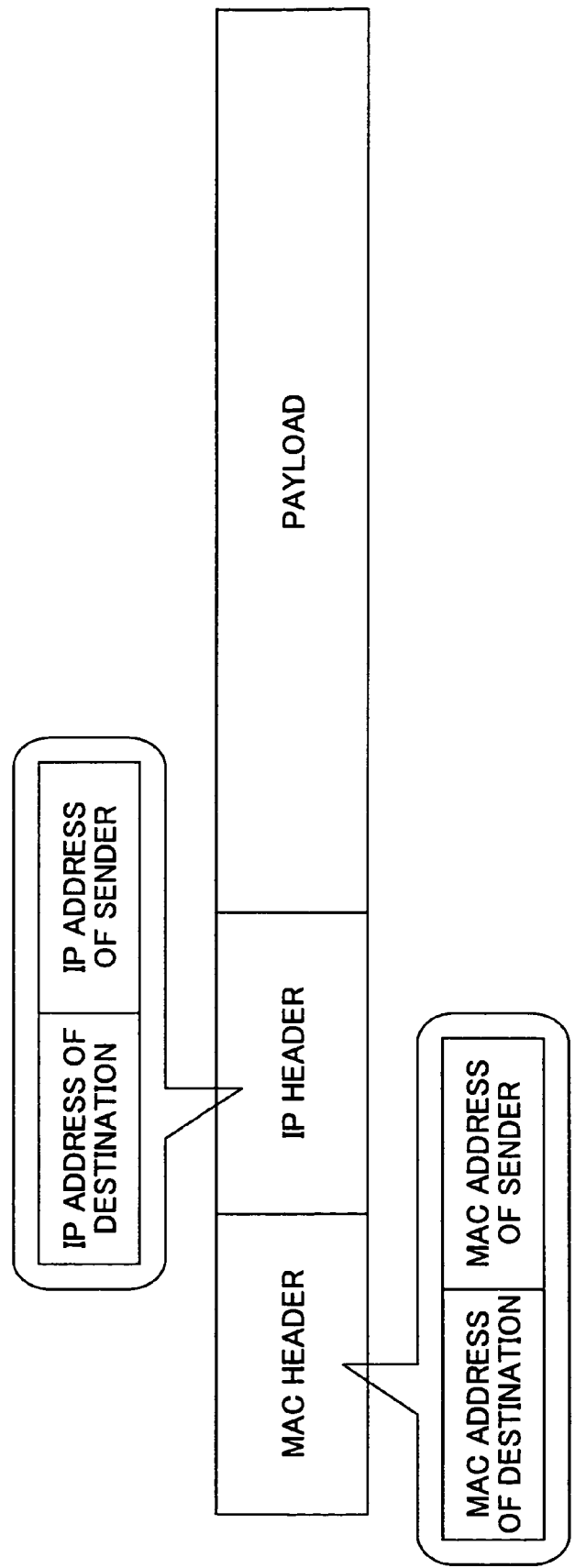
FIG. 3 is a schematic diagram for explaining the structure of a packet transmitted in a communication system according to an embodiment of the present invention.

The data structure of a data packet transmitted through the communication system is described below with reference to FIG. 3.

A packet includes a MAC header, an IP header, and a payload containing data that are to be transmitted. The MAC header and the IP header may be collectively referred to as a header. The MAC header contains the MAC addresses (of a data link layer) of a destination and a sender. The IP header contains the IP addresses (of a network layer) of the destination and the sender. That is, the header contains two types of addresses.

In the case of communication within the network 1, both the MAC address and the IP address are those of a counterpart of communication. In the case of communication with an external network via a gateway, the MAC address of the gateway and the IP address of the counterpart of the communication are used for the data link layer and the network layer, respectively.

Figure 4:
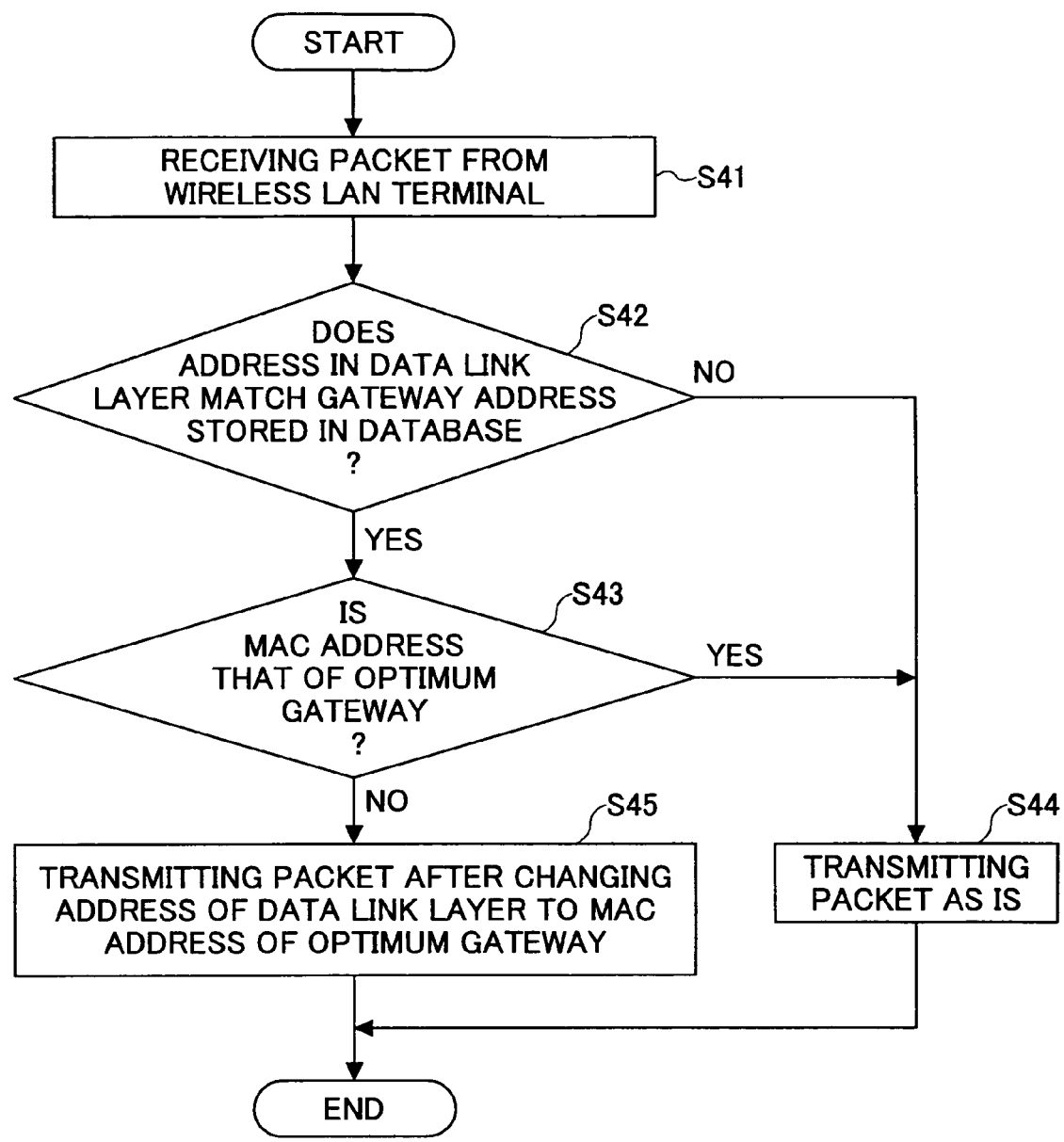
FIG. 4 is a flowchart for explaining steps performed by a wireless LAN station of a communication system according to an embodiment of the present invention.

Referring to FIG. 4, procedure performed by the wireless LAN station 3-1 in response to receipt of a data packet from the terminal 4-1 is described below.

According to an embodiment, the wireless LAN station 3-1 creates a control table of the MAC addresses of gateways thereby to control the identifiers of the gateways 5-1 and 5-2 connected to the network 1. The control table of the MAC addresses of the gateways is stored in the storage unit 3-14 as the gateway ID list 3-141.

The wireless LAN station 3-1 receives a packet from the wireless LAN terminal 4-1 (step S41), and determines whether the MAC address of destination contained in the received packet is registered in the control table (step S42). Specifically, the gateway selection unit 3-13 of the wireless LAN station 3-1 determines whether the destination address of data link layer matches the address of gateway stored in the storage unit 3-14.

If registered (YES in step S42), the wireless LAN station 3-1 determines whether the MAC address of destination is that of the optimum gateway for the terminal 4-1 (step S43). If the MAC address of destination is not that of the optimum gateway for the terminal 4-1 (NO in step S43), the route control unit 3-11 of the wireless LAN station 3-1 changes the MAC address of destination contained in the received packet to the MAC address of the optimum gateway. Then, the packet transmission unit 3-12 transmits the packet, the MAC address of which has been changed (step S45). If either a determination that the MAC address of destination contained in the received packet is not registered in the control table (NO in step S42) or a determination that the MAC address of destination is not that of the optimum gateway for the terminal 4-1 (YES in step S43) is made, then the packet transmission unit 3-12 transmits the received packet as is (step S44).

Figure 5:
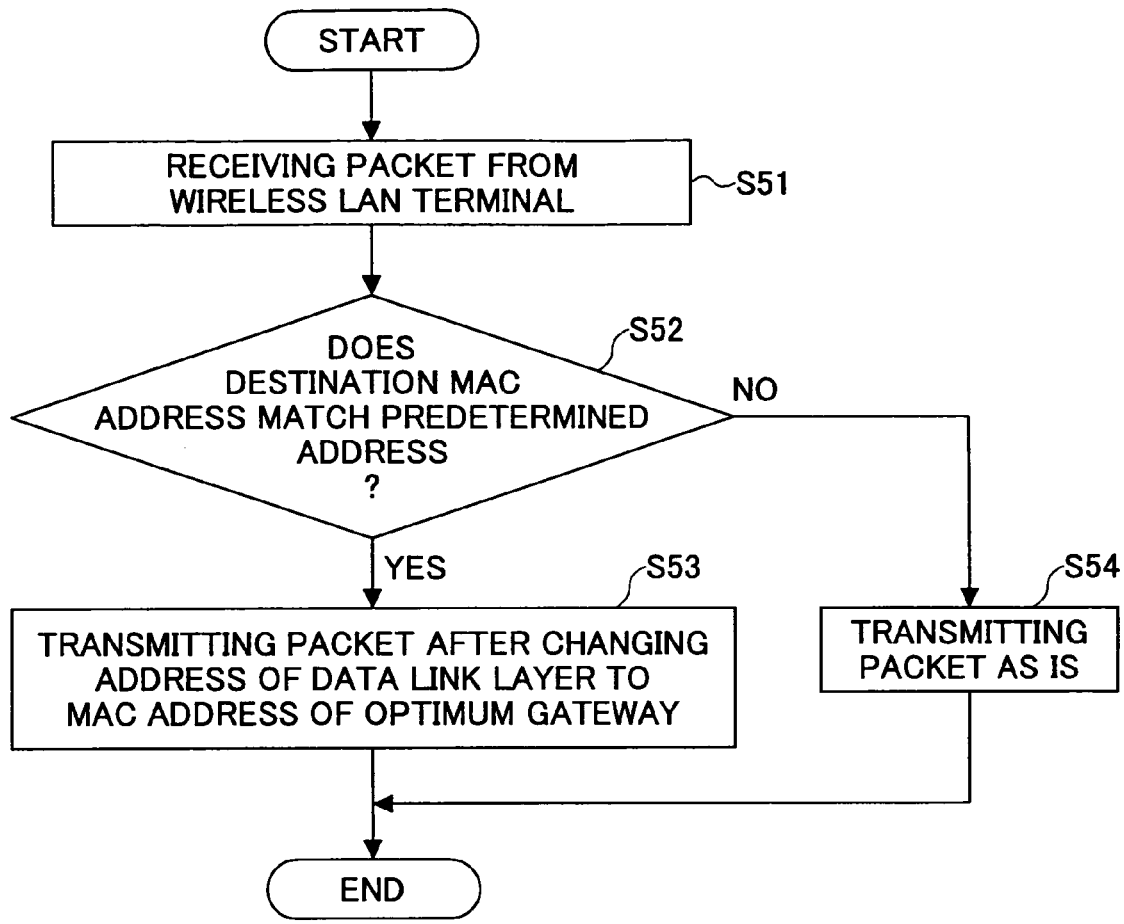
FIG. 5 is a flowchart for explaining steps performed by a wireless LAN station of a communication system according to another embodiment of the present invention.

Referring to FIG. 5, the case in which the MAC address of destination contained in the received packet is that of a predetermined MAC address is described below.

The gateway selection unit 3-13 of the wireless LAN station 3-1 receives a packet from the wireless LAN terminal 4-1 (step S51), and determines whether the MAC address of destination contained in the received packet matches the predetermined MAC address (step S52). In the affirmative case (YES in step S52), the route control unit 3-11 changes the MAC address of destination contained in the received packet to the MAC address of the optimum gateway. Then, the packet transmission unit 3-12 transmits the packet, the MAC address of which has been changed (step S53). If negative case (NO in step S52), the packet transmission unit 3-12 transmits the packet as is (step S54).

As described above, in the case in which the address of destination contained in the received packet is that of a predetermined MAC address, the address of destination contained in the received packet is changed to the MAC address of the optimum gateway. The condition of gateways and the condition of routes between the wireless LAN station and the gateways can be reflected to the route through which the packet is transmitted.

According to an embodiment, a router may be used as the gateway, and the router may be further doubled. In the case in which double routers are used, protocols such as virtual router redundancy protocol (VRRP) and hot standby routing protocol (HSRP) may be incorporated to the network of the wireless LAN stations.

When the double routers are used, multiple routers form a group and share one virtual IP address and one virtual MAC address. In normal operation, one of the routers represents the group and operates as a router having the virtual IP address and the virtual MAC address. Once the representing router fails, another one of the routers (backup router) having the second highest priority operates as the router having the virtual IP address and the virtual MAC address.

Each of these routers has the actual MAC address of its actual interface as well as the virtual MAC address. The route control unit 3-11 only has the information of route with respect to the actual MAC address of the routers. When an access point (wireless LAN station) receives a packet addressed to a virtual MAC address, the access point automatically changes the virtual MAC address to the actual MAC address. The access point learns the actual MAC addresses of the routers having the same virtual MAC address by peeking a packet transmitted in accordance with the protocol that realizes redundancy.

The route control unit 3-11 may operate based on the virtual MAC address. When the representing router is switched to the backup router, however, the route control unit 3-11 needs to be reset.

When a packet is transmitted from the terminal 4-1 via the gateway 5-1 or 5-2, the IP address of the counterpart of communication is designated as the destination address of network layer, and the MAC address of the gateway 5-1 or 5-2 is designated as the destination address of data link layer. The terminal 4-1 transmits a packet such as an address resolution protocol (ARP) packet for inquiring the MAC address of the gateway 5-1 or 5-2.

Figure 6:
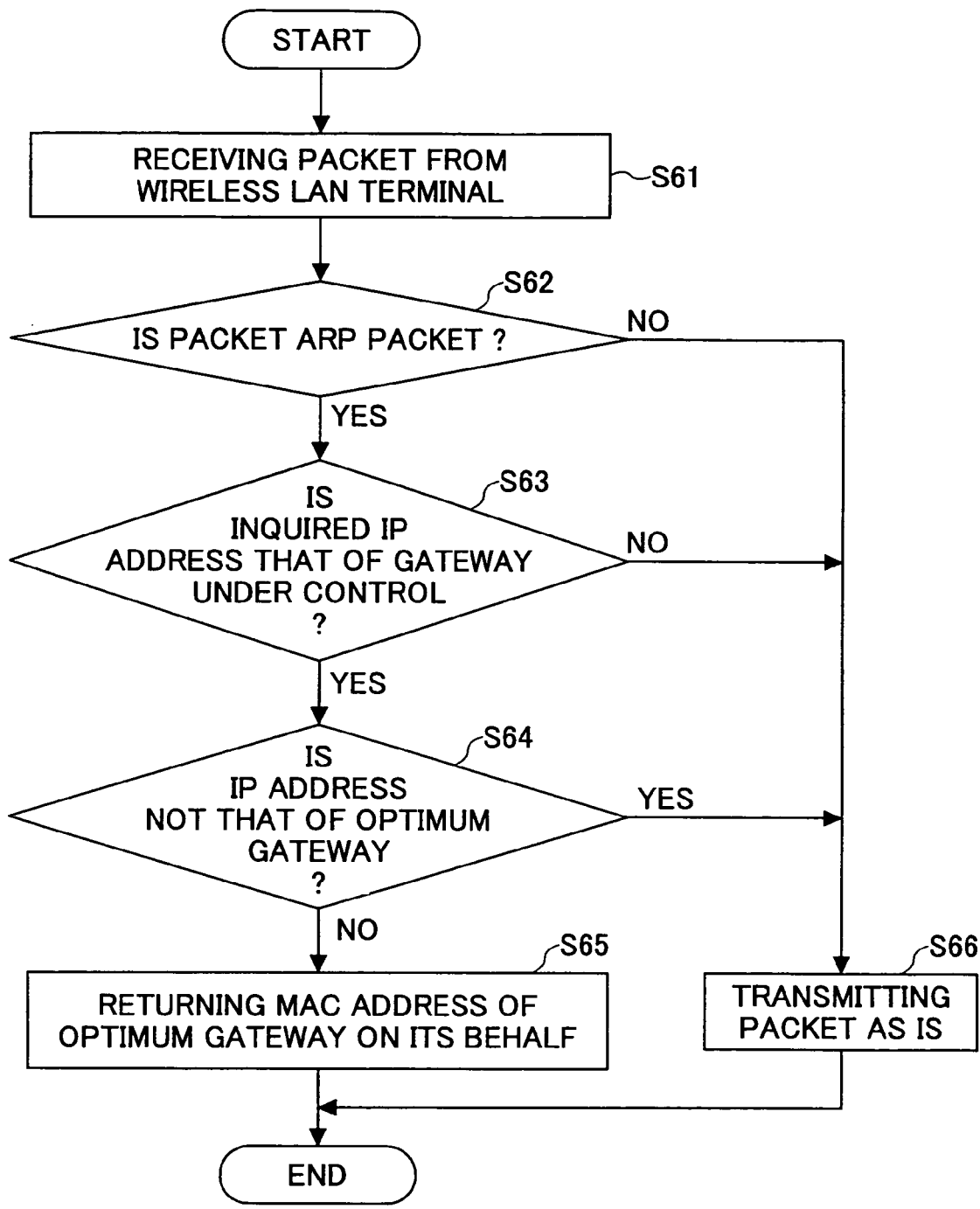
FIG. 6 is a flowchart for explaining steps performed by a wireless LAN station of a communication system according to yet another embodiment of the present invention.

Referring to FIG. 6, the operation of the wireless LAN station 3-1 in response to receipt of an ARP packet is described below. In the following description, an assumption is made that the MAC addresses of the gateways 5-1 and 5-2 are stored in a control table as the identifiers of the gateways.

The wireless LAN station 3-1 receives a packet from the wireless LAN terminal 4-1 (step S61), and the gateway selection unit 3-13 of the wireless LAN station 3-1 determines whether the received packet is an ARP packet (step S62). If the received packet is an ARP packet (YES in step S62), the gateway selection unit 3-13 determines whether the IP address inquired by the ARP packet is an IP address registered in the control table (step S63). If the determination is affirmative (YES in step S63), the gateway selection unit 3-13 further determines whether the IP address inquired by the ARP packet is the IP address of the optimum gateway for the wireless LAN terminal 4-1 (step S64).

If the determination is negative (NO in step S64), the route control unit 3-11 returns the MAC address of the optimum gateway on its behalf (step S65). If the above conditions are not satisfied (NO in step S62, NO in step S63, and YES in step S64), the packet transmission unit 3-12 transmits the ARP packet as is (step S66).

In the embodiment described above, when the wireless LAN station receives an ARP packet from the wireless LAN terminal, the gateway selection unit 3-13 determines whether the IP address inquired by the ARP packet is an IP address registered in the control table, and further determines whether the IP address inquired by the ARP packet is the IP address of the optimum gateway for the wireless LAN terminal. According to another embodiment, the gateway selection unit 3-13 determines whether the IP address inquired by the ARP packet is an IP address registered in the control table (step S63), and if the IP address inquired by the ARP packet is registered in the control table (YES in step S63), the route control unit 3-11 may returns the MAC address of the optimum gateway on its behalf (step S65). The gateway selection unit 3-13 may not determine whether the IP address inquired by the ARP packet is the IP address of the optimum gateway for the terminal even. That is, step S64 may be skipped in this case.

Figure 7:
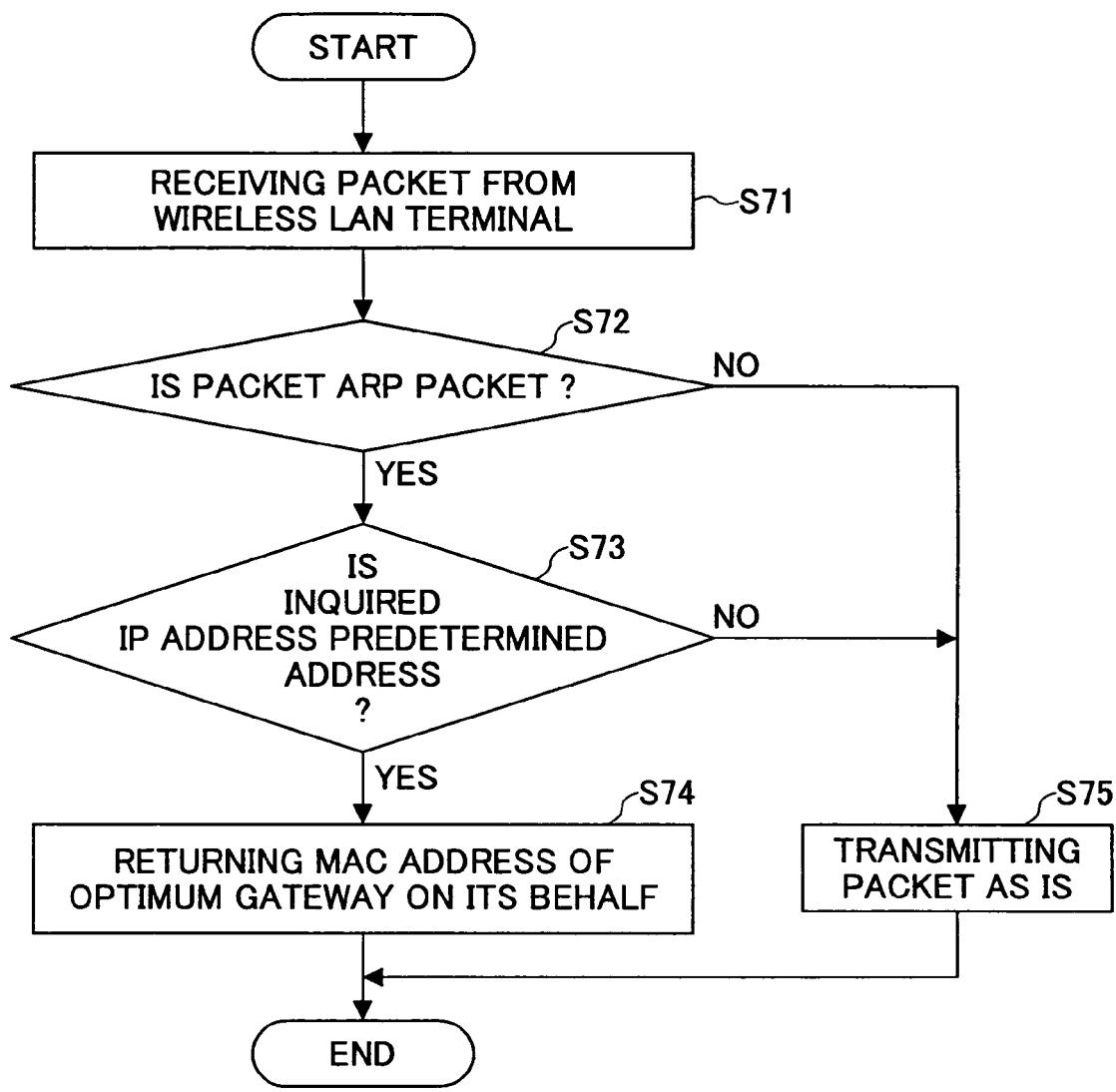
FIG. 7 is a flowchart for explaining steps performed by a wireless LAN station of a communication system according to yet another embodiment of the present invention.

Referring to FIG. 7, the case in which the IP address inquired in the ARP packet is a predetermined IP address is described below.

The wireless LAN station 3-1 receives a packet from the wireless LAN terminal 4-1 (step S71), and the gateway selection unit 3-13 of the wireless LAN station 3-1 determines whether the received packet is an ARP packet (step S72). If the received packet is an ARP packet (YES in step S72), the gateway selection unit 3-13 further determines whether the IP address inquired by the received ARP packet is a predetermined address (step S73).

If the IP address inquired by the received ARP packet is a predetermined address (YES in step S73), the route control unit 3-11 returns the MAC address of the optimum gateway on its behalf (step S74). If the above conditions are not met (NO in step S72, and NO in step S73), the packet transmission unit 3-12 transmits the received ARP packet as is (step S75).

As described above, in response to receipt of an ARP packet, the inquired IP address of which is a predetermined IP address, the wireless LAN station 3-1 returns the MAC address of the optimum gateway on behalf of the optimum gateway.

Referring to FIG. 8, a communication system according to a second embodiment of the present invention is described in detail below.

The above embodiments are related to the case in which a wireless LAN terminal connected to a wireless LAN station transmits a packet to an external network such as the network 2. In the following description, the case in which the communication system according to the second embodiment provides the selection of the optimum gateway to packets transmitted from an external network such as the network 2 to a wireless LAN terminal connected to a wireless LAN station is discussed.

As shown in FIG. 8A, when a packet (upstream packet) is transmitted from a wireless LAN terminal 4-2 to a wireless LAN station 3-5, the wireless LAN stations 3-5 and/or 3-7 selects the optimum gateway (gateway 5-4 in this case). The upstream packet is transmitted to a wireless LAN station in an external network through the wireless LAN stations 3-5 and 3-7, the optimum gateway 5-4, a router 6 as indicated by a dotted line in FIG. 8A.

When a packet (downstream packet) is transmitted from the terminal 4-3 in the external network (network 2, FIG. 1) to the terminal 4-2 connected to the network 1 (FIG. 1), any communication apparatus in the network 2 may not have information which gateway is optimum.

In the communication system according to the second embodiment, when receiving a packet addressed to a wireless LAN terminal from the network 2, a gateway automatically transfers the packet to another gateway which is optimum for the wireless LAN terminal.

Figure 9:
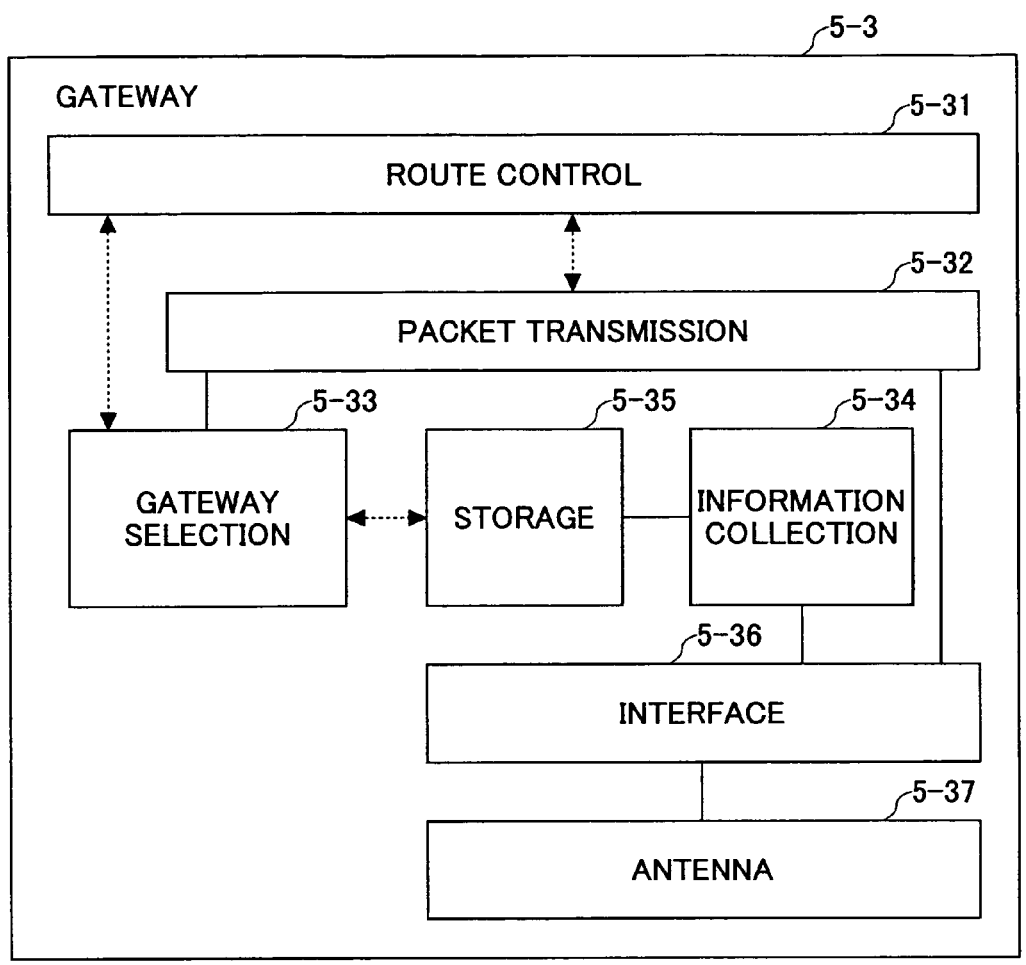
FIG. 9 is a block diagram for explaining a gateway of a communication system according to a second embodiment of the present invention.

Referring to FIG. 9, the gateway which is suitably designed for the communication system according to the second embodiment is described in detail.

Since both gateways 5-3 and 5-4 are structured in the same manner, only the gateway 5-3 is described below and the description of the gateway 5-4 is omitted.

The gateway 5-3 includes a route control unit 5-31, a packet transmission unit 5-32 connected to the route control unit 5-31, and a gateway selection unit 5-33 connected to the route control unit 5-31 and the packet transmission unit 5-32. The gateway 5-3 further includes a storage unit 5-35 connected to the gateway selection unit 5-33, and an information collection unit 5-34 connected to the storage unit 5-35. The gateway 5-3 yet further includes an interface 5-36 connected to the packet transmission unit 5-32 and the information collection unit 5-34, and an antenna 5-37 connected to the interface 5-36.

A wireless LAN station informs the gateway 5-3 of a combination of the identifier of the wireless LAN terminal 4-2 and the identifier of the optimum gateway for the wireless LAN terminal 4-2. The information of the identifiers is provided to the information collection unit 5-34 via the antenna 5-37 and the interface 5-36, and stored in the storage unit 5-35 by the information collection unit 5-37.

The gateway selection unit 5-33 selects a gateway to which a packet addressed to the wireless LAN terminal 4-2 is transferred based on the information of the identifiers. The route control unit 5-31 controls routes to the gateway selected by the gateway selection unit 5-33. The packet transmission unit 5-32 transfers the packet to the gateway selected by the gateway selection unit 5-33.

The operation of the gateway 5-3 is described in detail below. In the following description, an assumption is made that the gateway 5-4 is optimum for the wireless LAN terminal 4-2, and the gateway 5-3 transfers a packet addressed to the wireless LAN terminal 4-2 to the gateway 5-4.

The wireless LAN stations 3-5, 3-6, and 3-7 sends the gateway 5-3 information such as the identifier of the wireless LAN terminal 4-2 and the identifier of a gateway which is optimum for the wireless LAN terminal 4-2. The gateway selection unit 5-33 of the gateway 5-3 determines a destination (gateway 5-4 in this case) to which the packet is transferred based on the received information of the identifiers of the wireless LAN terminal 4-2 and the optimum gateway. In response to the determination by the gateway selection unit 5-33, the packet transmission unit 5-32 transfers the packet to the destination. The route through which the packet is transferred to the optimum gateway 5-4 is controlled by the route control unit 5-31.

As described above, the wireless LAN stations informs the gateways which gateway is optimum for each wireless LAN terminal. An example of the identifier includes an IP address and a MAC address. The wireless LAN stations may send the information of the optimum gateway for each wireless LAN terminal by broadcasting or multicasting the information in the network 1, or by unicasting the information to each gateway.

A gateway can learn that it is selected as the optimum gateway for a particular terminal in the network 1 by peeking the sender address of a packet received from the particular terminal in the network 1. Therefore, according to an embodiment, the gateway may include an informing unit (not shown) that sends other gateways information that the gateway itself is the optimum gateway for the particular terminal.

According to another embodiment, a upper rank apparatus such as a router 6 in the network 2 may select the optimum gateway for a particular terminal in the network 1, as shown in FIG. 8B. In this case, the gateway needs to inform the upper rank apparatus of the identifier of the wireless LAN terminal that has selected the gateway as being optimum for the particular terminal. According to the above arrangements, the gateways do not need to exchange packets.

Figure 10:
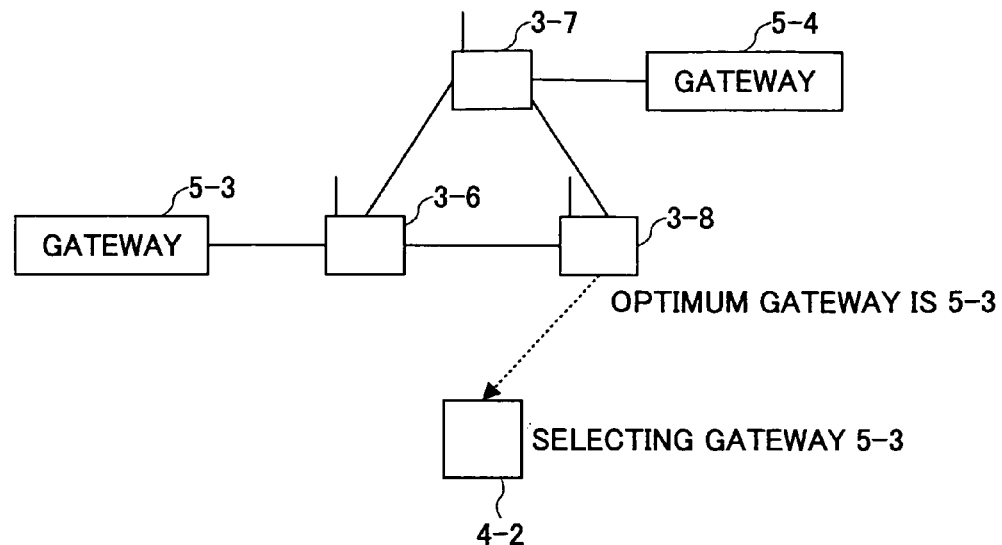
FIG. 10 is a schematic diagram for explaining a communication system according to a third embodiment of the present invention, in which a wireless LAN station notifies of an appropriate gateway.

Referring to FIG. 10, a communication system according to a third embodiment of the present invention is described in detail below.

In the above embodiments, the case in which a wireless LAN station selects a gateway which is optimum for a terminal, and automatically directs packets to the selected gateway is discussed. However, the terminal may be informed of information about available gateways by the wireless LAN station using beacon, for example, and selects the optimum gateway by itself.

In a communication system according to the present embodiment, a wireless LAN station 3-8 includes all the elements of the wireless LAN station 3-1 described with reference to FIG. 2, and further includes a gateway informing unit (not shown) that sends information about gateways to a wireless LAN terminal.

An example of the information about gateways sent from the wireless LAN station 3-8 to the wireless LAN terminal 4-2 may include the identifier of the optimum gateway, the list of available gateways and their priorities, the channel condition between the wireless LAN station and the gateway, and the combination thereof. For example, the wireless LAN station 3-8 may send the wireless LAN terminal 4-2 information indicating that the optimum gateway is the gateway 5-3. In response to receipt of the information from the wireless LAN station 3-8, the wireless LAN terminal 4-2 can select the gateway 5-3.

Figure 11:
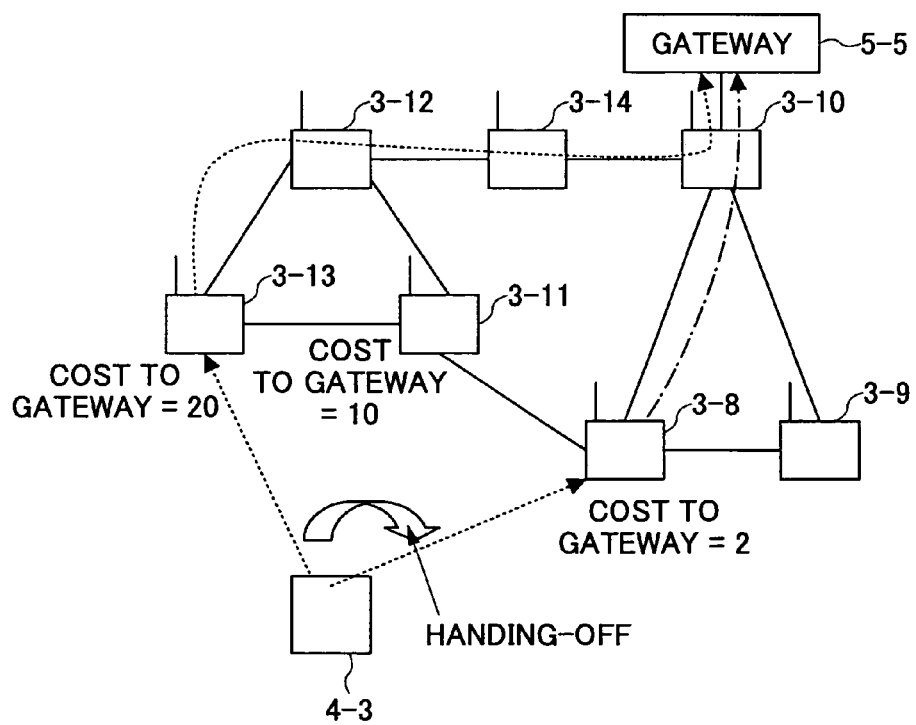
FIG. 11 is a schematic diagram for explaining a communication system according to a third embodiment of the present invention, in which a terminal is handed off between wireless LAN stations.

As shown in FIG. 11, if the wireless LAN terminal 4-3 finds a wireless LAN station that can provide better route than current one using the above information about gateways, the wireless LAN terminal 4-3 may hand off to the wireless LAN station.

For example, consider that the wireless LAN terminal 4-3 is connected to a wireless LAN station 3-13, and the cost of link between the wireless LAN station 3-13 and the gateway 12 is 20. If the wireless LAN terminal 4-3 receives information indicating the existence of another wireless LAN station 3-8 the cost of which is less than 20, the wireless LAN terminal 4-3 may hand-off to the wireless LAN station 3-8. The cost of a link is described in detail below.

In this case, the wireless LAN terminal 4-3 receives information indicating that the cost between the wireless LAN station 3-13 and the gateway 5-5 being 20, the cost between the wireless LAN station 3-11 and the gateway 5-5 being 10, and the cost between the wireless LAN terminal 3-8 and the gateway 5-5 being 2. The wireless LAN terminal 4-3 may hand off to the wireless LAN station 3-8. At the same time, if the wireless LAN terminal 4-3 finds another gateway to be optimal, the wireless LAN terminal 4-3 can select the optimal gateway.

Figure 12:
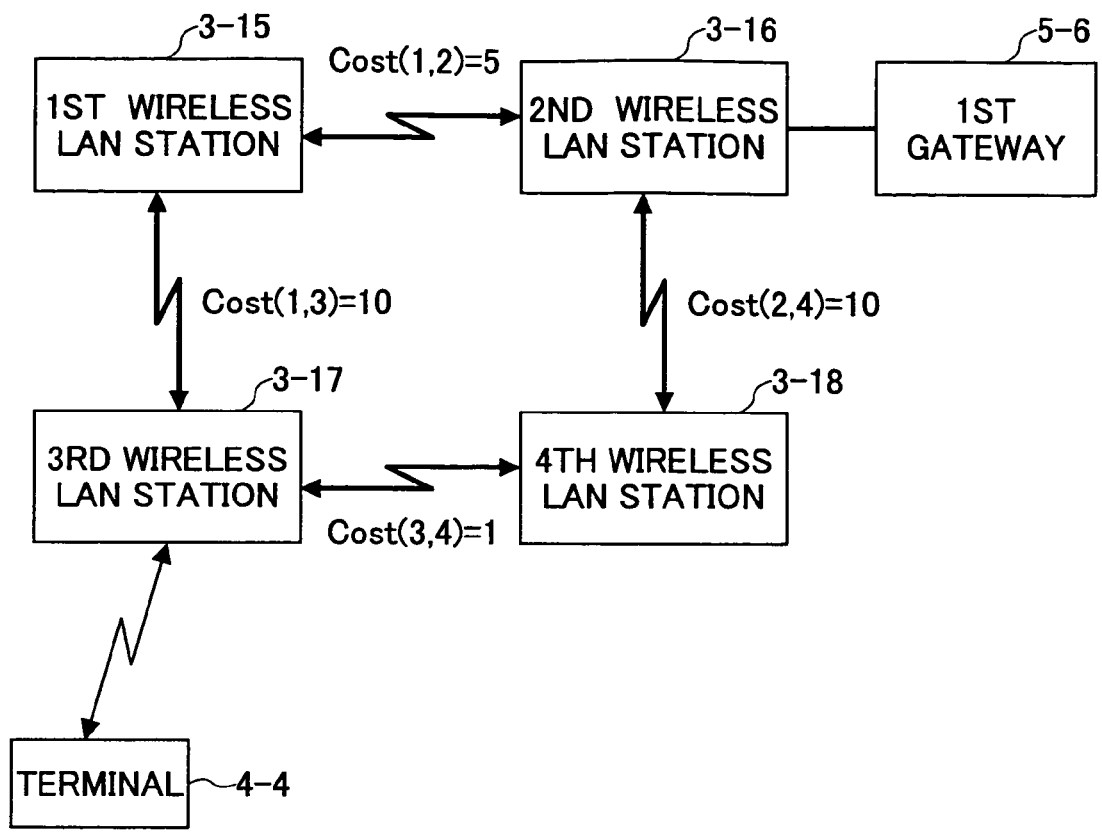
FIG. 12 is a schematic diagram for explaining routing of a communication system according to a fourth embodiment of the present invention.
Figure 13:
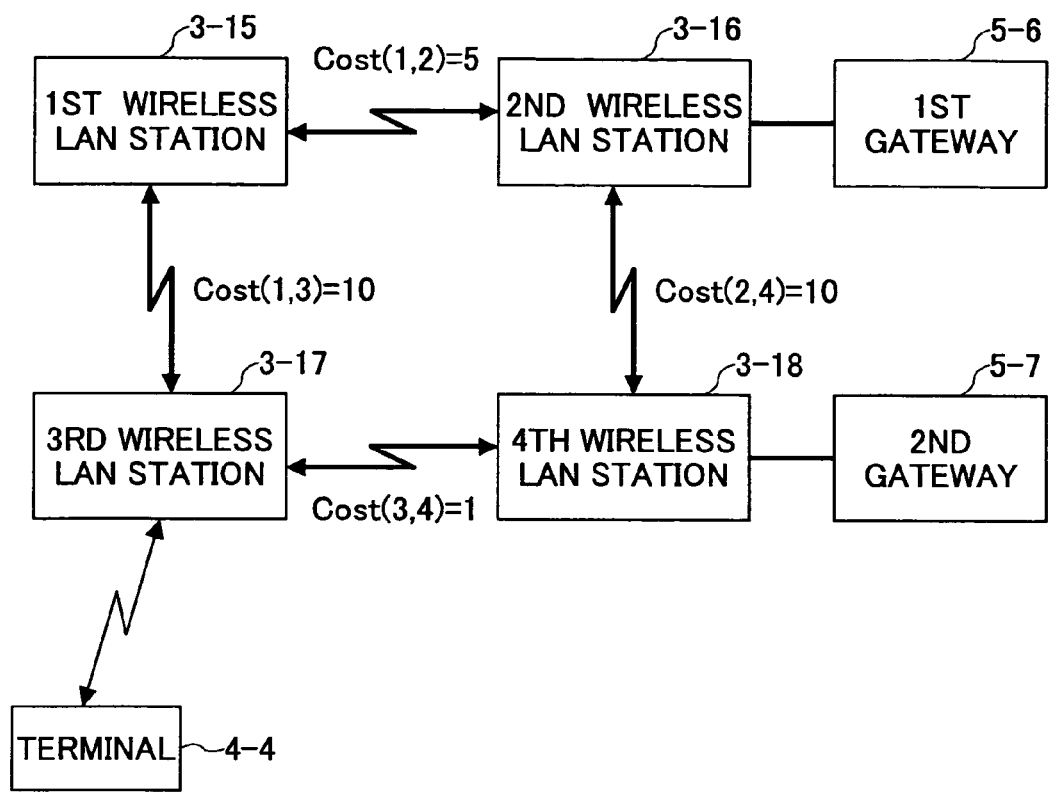
FIG. 13 is a schematic diagram for explaining routing of a communication system according to a fourth embodiment of the present invention.

Referring to FIGS. 12 and 13, a communication system according to a fourth embodiment of the present invention is described below.

The route control unit of a communication apparatuses such as wireless LAN stations assign a value which is referred to as cost to each link between the communication apparatuses, and selects a link the cost of which is minimum. The controlling of routes based on the cost is described with reference to FIG. 12.

A mesh network shown in FIG. 12 includes a first wireless LAN station 3-15, a second wireless LAN station 3-16, a third wireless LAN station 3-17, a fourth wireless LAN station 3-18. Additionally, a first gateway 5-6 is connected to the second wireless LAN station 3-16.

The case in which a wireless LAN terminal 4-4 connected to the third wireless LAN station 3-17 is connected with the first gateway 5-6 is discussed.

The cost of a link connecting the first wireless LAN station 3-15 and the second wireless LAN station 3-16 is represented "Cost(1,2)". The cost of a link connecting the first wireless LAN station 3-15 and the third wireless LAN station 3-17 is represented "Cost(1,3)". The cost of a link connecting the second wireless LAN station 3-16 and the fourth wireless LAN station 3-18 is represented "Cost(2,4)". The cost of a link connecting the third wireless LAN station 3-17 and the fourth wireless LAN station 3-18 is represented "Cost(3,4)". As shown in FIG. 12, it is assumed that Cost(1,2)=5, Cost(1,3)=10, Cost(2,4)=10, and Cost(3,4)=1.

The third wireless LAN station 3-17 to which the wireless LAN terminal 4-4 is connected needs to determine through which wireless LAN terminal the wireless LAN station 3-17 transmits packets received from the wireless LAN terminal 4-4 to the first gateway 5-6. The first gateway 5-6 is connected to the second wireless LAN station 3-16. It is sufficient to determine a route from the third wireless LAN station 3-17 to the second wireless LAN station 3-16. The determination may be performed using a route control protocol.

There are multiple routes for connecting the third wireless LAN station 3-17 and the second wireless LAN station 3-16. The route control protocol the route with the least cost to be selected by collecting and summing the cost of all links connecting the wireless LAN stations across the entire routes. An example of the cost of a link includes the bandwidth of the link and the delay caused by the link, for example.

In this case, there are two routes connecting the third wireless LAN station 3-17 and the second wireless LAN station 3-16, that is, one passing through the first wireless LAN station 3-15 (route 1), and another one passing through the fourth LAN station 3-18 (route 2).

The cost of the route 1 is Cost(1,3)+Cost(1,2)=10+5=15, and the cost of the route 2 is Cost(3,4)+Cost(2,4)=1+10=11. The cost of the route 2 is less than that of the route 1. Accordingly, the wireless LAN terminal 4-4 selects the route 2 to connect to the first gateway 5-6.

Referring FIG. 13, the controlling of routes based on the calculation of the cost in the case in which multiple gateways are connected to the network is discussed below.

A communication system shown in FIG. 13 is different from the communication system shown in FIG. 12 in that a second gateway 5-7 is connected to the fourth wireless LAN station 3-18.

Even if multiple gateways exist in a communication system, the route control protocol can be used to determine the routes between the wireless LAN stations to which the gateways are connected and the third wireless LAN station 3-17 to which the wireless LAN terminal 4-4 is connected. The cost between the third wireless LAN station 3-17 and the first gateway 5-6 (route 2) is 11, as calculated above. The cost between the third wireless LAN station 3-17 and the second gateway 5-7 (that is, the fourth wireless station 3-18) is 1.

If the performance of the first and second gateways 5-6, 5-7 is identical, the wireless LAN terminal 4-4 would be obviously better off to select the second gateway 5-7. However, the wireless LAN terminal 4-4 does not have functionality to perform the route control protocol, and consequently, has no knowledge about the cost. Therefore, the wireless LAN station 3-17 having the cost information may select the gateway on behalf of the wireless LAN terminal 4-4.

In the above description, it is assumed that all gateways provided in the communication system have the same performance. However, the bandwidth of channels connecting the gateways and the external network may be different, and the traffic on the channels may differ. It is desirable that the condition of the gateways such as the above differences is taken into consideration upon the selection of routes.

According to an embodiment, the condition of a gateway may be reflected as cost to the computation of the cost of a route in a mesh network between access points. An example of the cost includes the bandwidth and traffic load. In addition, if the wireless LAN terminal 4-4 is a mobile terminal, the remaining battery of the mobile terminal may be reflected as cost.

Consider that, in the communication system shown in FIG. 13, the cost of the first gateway 5-6 is Cost(GW1)=15, and the cost of the second gateway 5-7 is Cost(GW2)=10.

Under such assumptions, the cost of the case in which the wireless LAN terminal 4-4 uses the first gateway 5-6 becomes Cost(1,3)+Cost(1,2)+Cost(GW1)=10+5+15=30, and the cost of the case in which the wireless LAN terminal 4-4 uses the second gateway 507 becomes Cost(3,4)+Cost(GW2)=1+10=11. The wireless LAN terminal 4-4 is better off to use the second gateway 5-7. Accordingly, the access point selects the second gateway 5-7 on behalf of the wireless LAN terminal 4-4.

Figure 14A:
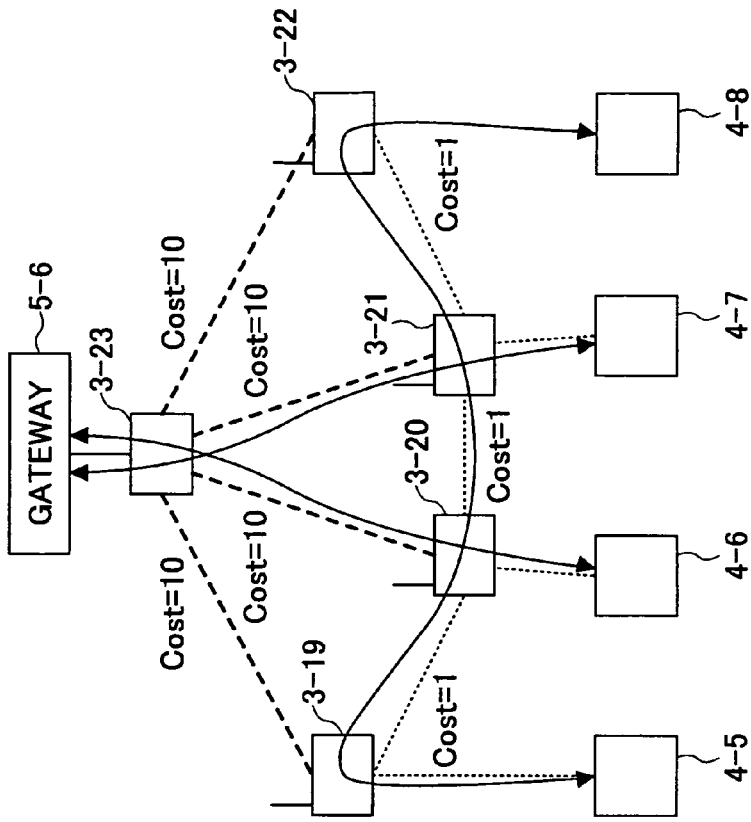
FIG. 14 is a schematic diagram for explaining the dispersion of traffic of a communication system according to a fifth embodiment of the present invention.
Figure 14B:
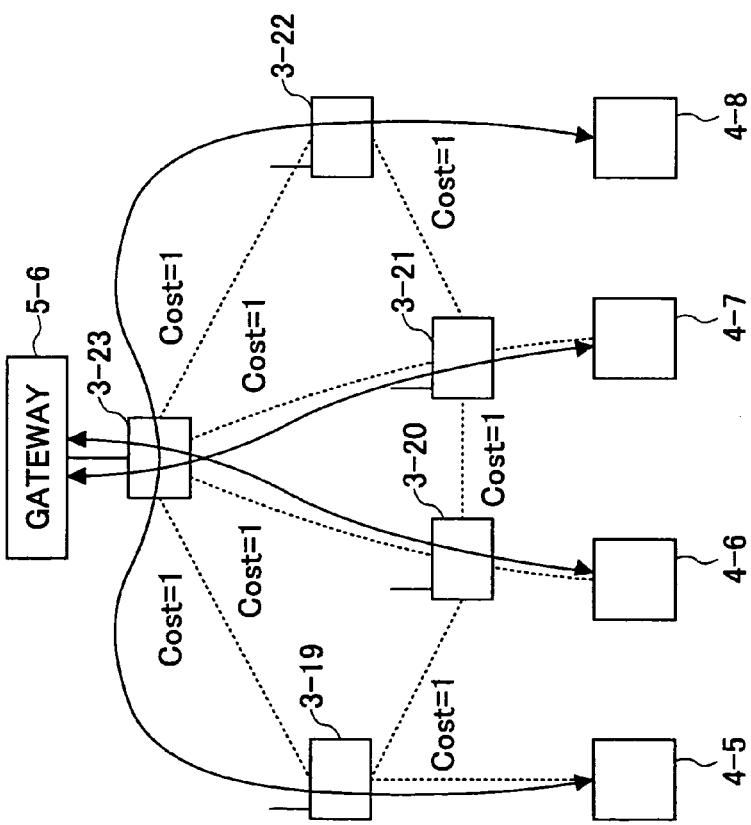

Referring to FIG. 14, a communication system according to a fifth embodiment is described in detail below.

The communication system according to the present embodiment can diversify traffics congesting to a gateway. The controlling of routes in the communication system according to the present embodiment is discussed below.

As shown in FIG. 14A, many traffics congest to a gateway 5-6, and channels around the gateway 5-6 may be congested.

In FIG. 14A, wireless LAN terminals 4-5 through 4-8 are connected to wireless LAN stations 3-19 through 3-22, respectively. The wireless LAN stations 3-19 through 3-22 are connected to a wireless LAN station 3-23. The wireless LAN station 3-23 is connected to a gateway 5-6. The wireless LAN stations 3-19 and 3-20 are connected, the wireless LAN stations 3-20 and 3-21 are connected, and the wireless LAN stations 3-21 and 3-22 are connected.

An example of traffics that congest to the wireless LAN station 3-23 to which the gateway 5-6 is connected includes a traffic starting from the wireless LAN terminal 4-5, passing the wireless LAN station 3-19, the wireless LAN station 3-23, the wireless LAN station 3-22 and ending at the wireless LAN terminal 4-8. Another example is a traffic starting from the wireless LAN terminal 4-6, passing through the wireless LAN station 3-20, the wireless LAN station 3-23, and ending at the gateway 5-6, and a traffic starting from the wireless LAN terminal 4-7, passing through the wireless LAN station 3-21, the wireless LAN station 3-23, and ending at the gateway 5-6.

To avoid the congestion on channels around the gateway, a priority control unit (not shown) is provided to each of the wireless LAN station 3-19 through 3-23. The priority control unit controls the priority of links connecting the wireless LAN station in which the priority control unit is provided and other wireless LAN stations. Additionally, the cost of links directly connected to the wireless LAN station 3-23 to which the gateway 5-6 is connected is set at a high level. According to the above arrangements, the traffic from the wireless LAN terminal 4-5 to the wireless LAN terminal 4-8 does not pass through the wireless LAN stations 3-19, 3-23, and 3-22, but does pass through the wireless LAN stations 3-19, 3-20, 3-21, and 3-22 to reduce the total cost. As a result, the traffic which does not directed to the gateway can be rerouted.

Referring to FIG. 15, the disposition of a gateway in the communication system according to the above embodiments is explained below.

Figure 15A:
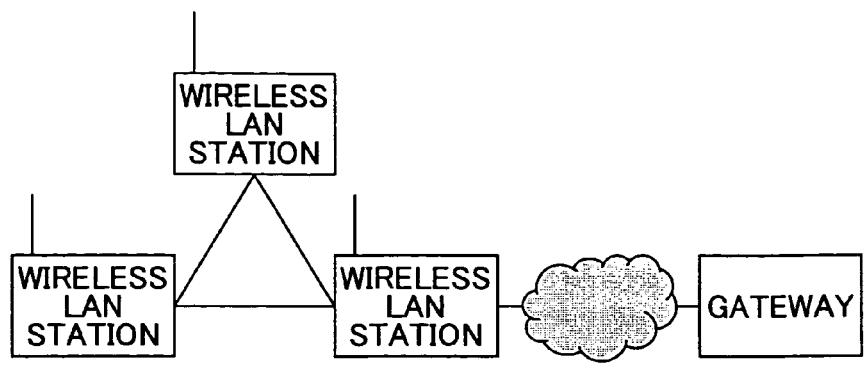
FIGS. 15A through 15D are schematic diagrams for explaining the disposition a gateway in a communication system according to an embodiment of the present invention.
Figure 15B:
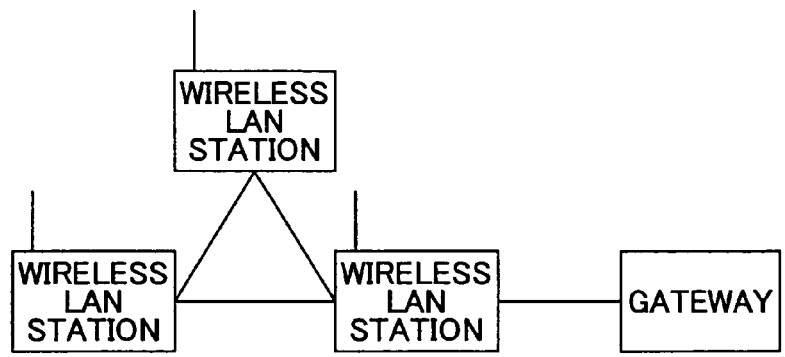
Figure 15C:
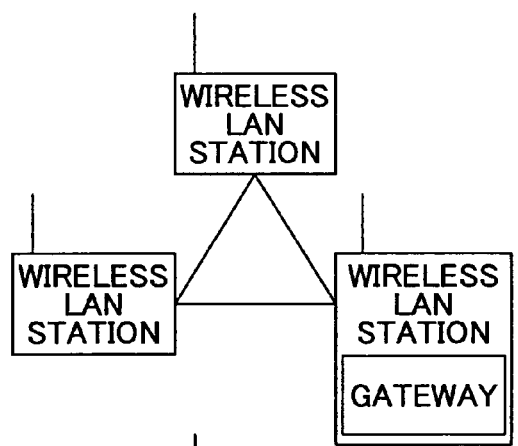
Figure 15D:
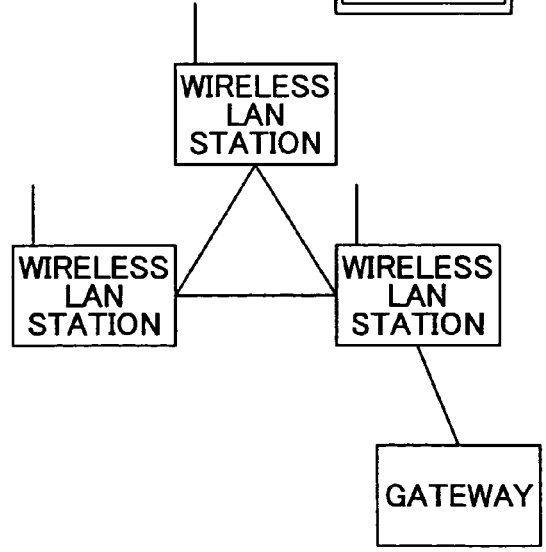

FIG. 15A shows the case in which the gateway is connected to the access point via a network. FIG. 15B shows the case in which the gateway is directly connected to the access point. FIG. 15C shows the case in which the gateway is embedded in the access point. FIG. 15D shows the case in which the gateway is under the control of the access point. It should be understood that the present invention is applicable any of the above cases.

In some of the above embodiments, the wireless LAN station determines the optimum gateway by calculating the cost from the wireless LAN station to which the wireless LAN terminal is connected to the gateway. According to another embodiment, the cost may be estimated by transmitting a special packet for measuring the cost to the gateway. According to yet another embodiment, a combination of the traffic condition and the bandwidth of the gateway may be determined for the estimation of cost.

If one or more wireless LAN stations move resulting in any change in network topology, the gateway which has been optimum for the wireless LAN terminal may be no more optimal. In this case, the information available from the route control unit is updated. As a result, a new optimum gateway is automatically selected based on the updated information.

When the wireless LAN terminal moves and is handed over from a wireless LAN station to another, the other wireless LAN station can direct packets from the wireless LAN terminal to the optimum gateway. As a result, the wireless LAN terminal can access the optimum gateway.

Although the embodiments of the present invention has been described with reference to a wireless LAN as an example, it is noted that the present invention is applicable to other suitable communication systems such as a cellular phone system and a Bluetooth system.

According to the above embodiments, the wireless LAN station forming an ad hoc network selects the optimum gateway on behalf of a wireless LAN terminal, since the wireless LAN station can obtain information about the network condition, for example. According to the above arrangement, the wireless LAN terminal can communicate with an external network through the optimum gateway for the wireless LAN terminal.

Additionally, the wireless LAN terminal may be handed over to another wireless LAN station which can provide a better route to the gateway.

Traffics congesting to links close to the gateway can be rerouted by increasing the cost assigned to the links.

According to the above embodiments of the present invention, when selecting a gateway which is suitable for a terminal, the condition of routes connecting the terminal and the gateway can be reflected.

The present invention is not limited to these embodiments, but various variations and modifications may be made without departing from the scope of the present invention.

This patent application is based on Japanese priority patent application No. 2004-44632 filed on Feb. 20, 2004, the entire contents of which are hereby incorporated by reference.

What is claimed is:

1. A wireless communication apparatus configured to form a network with other wireless communication apparatuses, the wireless communication apparatus comprising:

an information collection unit configured to collect route information on states of routes between the wireless communication apparatus and respective connection apparatuses, each of the connection apparatuses connecting the network and another network, and connection apparatus information on the connection apparatuses;

a storage unit configured to store the route information and the connection apparatus information collected by said information collection unit;

a selection unit configured to select one of the connection apparatuses optimum for a terminal apparatus bases on the route information and the connection apparatus information stored in said storage unit; and a route control unit configured to routes transmission of data from the terminal apparatus to the one of the connection apparatuses selected by said selection unit, wherein said selection unit is further configured to determined, in response to receipt of a packet from the terminal apparatus, the packet including an identifier of a first connection apparatus as a destination, wherein the first connection apparatus satisfies a predetermined condition, based on the route information and the connection apparatus information stored in said storage unit; and said route control unit is further configured to change the identifier included in the packet to the identifier of a second connection apparatus that satisfies the predetermined condition based on the determination made by said selection unit.

2. The wireless communication apparatus as claimed in claim 1, further comprising:

a notification unit configured to notify at least one of the other wireless communication apparatus of information indicating at least one of quality of routes between the wireless communication apparatus and the respective connection apparatuses and priorities of the routes between the wireless communication apparatus and the respective connection apparatuses, wherein said selection unit is further configured to select one of the connection apparatuses that satisfies the predetermined condition based on the information notified by said notification unit of at least one of the other wireless communication apparatuses.

3. The wireless communication apparatus as claimed in claim 2, wherein said selection unit is further configured to reselect the connection apparatus based on the information notified by said notification unit of at least one of the other wireless communication apparatuses.

4. The wireless communication apparatus as claimed in claim 1, further comprising:

a priority control unit configured to control a route priority between the wireless communication apparatus and the selected one of the connection apparatuses.

5. A connection apparatus configured to connect a network including wireless communication apparatuses as claimed in claim 1 to another network, the connection apparatus comprising:

an information collection unit configured to collect a combination of an identification of a terminal apparatus and an identification of the connection apparatus or another connection apparatus whichever is optimum for the terminal apparatus obtained from the communication apparatuses;

a storage unit configured to store the combination of identifications collected by said information collection unit;

a selection unit configured to select the connection apparatus or the other connection apparatus for the terminal apparatus as an optimum connection apparatus through which data to be transmitted to the terminal apparatus is transmitted, based on the combination of identification stored in said storage unit; and a route control unit configured to route the data to be transmitted to the terminal apparatus to the other connection apparatus if the connection apparatus has not been selected as the optimum connection apparatus.

6. The connection apparatus as claimed in claim 5, further comprising:

a notification unit configured to notify the other connection apparatus that the connection apparatus has been selected as the optimum connection apparatus.

7. A wireless communication apparatus configured to form a network with other wireless communication apparatuses, the wireless communication apparatus comprising:

an information collection unit configured to collect route information on states of routes between the wireless communication apparatus and respective connection apparatuses, each of the connection apparatuses connecting the network and another network, and connection apparatus information on the connection apparatuses;

a storage unit configured to store the route information and the connection apparatus information collected by said information collection unit;

a selection unit configured to select one of the connection apparatuses optimum for a terminal apparatus based on the route information and the connection apparatus information stored in said storage unit; and a route control unit configured to route transmission of data from the terminal apparatus to the one of the connection apparatuses selected by said selection unit, wherein said selection unit is further configured to determine, when a packet is received from the terminal apparatus, the packet inquiring the data link layer address of a connection apparatus, and if the network layer address contained in the packet is that of a first connection apparatus, whether the first connection apparatus satisfies a predetermined condition, based on the route information and the connection apparatus information stored in said storage unit; and said route control unit is further configured to return unchanged the data link layer address of the first connection apparatus when the determination made by said selection unit was that the first connection apparatus was optimum, but otherwise change the data link layer address to another address of the one of the connection apparatuses that is optimum as determined by the selection unit.

8. A connection apparatus configured to connect a network including communication apparatuses as claimed in claim 7 to another network, the connection apparatus comprising:

an information collection unit configured to collect a combination of an identification of a terminal apparatus and an identification of the connection apparatus or another connection apparatus whichever is optimum for the terminal apparatus obtained from the communication apparatuses;

a storage unit configured to store the combination of identifications collected by said information collection unit;

a selection unit configured to select the connection apparatus or the other connection apparatus for the terminal apparatus as an optimum connection apparatus through which data to be transmitted to the terminal apparatus is transmitted, based on the combination of identification stored in said storage unit; and a route control unit configured to route the data to be transmitted to the terminal apparatus to the other connection apparatus if the connection apparatus has not been selected as the optimum connection apparatus.

9. A communication system, comprising:

a network and another network;

a communication apparatus that communicates in the network with other communication apparatuses, the communication apparatus including an information collection unit configured to collect route information on routes between the communication apparatus and respective connection apparatuses, each of the connection apparatuses connecting the network and another network, and connection apparatus information on the connection apparatuses, a storage unit configured to store the route information and the connection apparatus information collected by said information collection unit, a selection unit configured to select one of the connection apparatuses optimum for a terminal apparatus based on the route information and the connection apparatus information stored in said storage unit, and a route control unit configured to route transmission of data from the terminal apparatus to the one of the connection apparatuses selected by said selection unit, wherein said selection unit is further configured to determine, in response to receipt of a packet from the terminal apparatus, the packet including an identifier of a first connection apparatus as a destination, whether the first connection apparatus satisfies a predetermined condition, based on the route information and the connection apparatus information stored in said storage unit, and said route control unit is further configured to change the identifier included in the packet to the identifier of a second connection apparatus that satisfies the predetermined condition based on the determination made by said selection unit;

a connection apparatus of the respective connection apparatuses, said connection apparatus including an information collection unit configured to collect a combination of an identification of a terminal apparatus and an identification of the connection apparatus or another connection apparatus whichever is optimum for the terminal apparatus obtained from the communication apparatuses, a storage unit configured to store the combination of identifications collected by said information collection unit, a selection unit configured to select the connection apparatus or the other connection apparatus for the terminal apparatus as an optimum connection apparatus through which data to be transmitted to the terminal apparatus is transmitted, based on the combination of identification stored in said storage unit, and a route control unit configured to route the data to be transmitted to the terminal apparatus to the other connection apparatus if the connection apparatus has not been selected as the optimum connection apparatus.

10. A method of communicating through a network formed by a plurality of wireless communication apparatuses, the network connected with another network via connection apparatuses, the method comprising the steps of:

collecting route information on routes between the wireless communication apparatus and the respective connection apparatuses and connection apparatus information on the connection apparatuses;

storing in a computer readable memory the route information and the connection apparatus information collected;

selecting one of the connection apparatuses optimum for a terminal apparatus based on the route information and the connection apparatus information stored; and routing transmission of data from the terminal apparatus to the one of the connection apparatuses selected, said selecting step also determines, in response to receipt of packets from the terminal apparatus, the packet including an identifier of a first connection apparatus as a destination, whether the first connection apparatus satisfies a predetermined condition, based on the route information and the connection apparatus information stored during said storing step; and said routing step also changes the identifier included in the packet to the identifier of a second connection apparatus that satisfies the predetermined condition based on the determination made in the selecting step.

11. A method of communicating through a network formed by a plurality of wireless communication apparatuses, the network connected with another network via connection apparatuses, the method comprising the steps of:

collecting route information on routes between the wireless communication apparatus and the respective connection apparatuses and connection apparatus information on the connection apparatuses;

storing in a computer readable memory the route information and the connection apparatus information collected;

selecting one of the connection apparatuses optimum for a terminal apparatus based on the route information and the connection apparatus information stored; and routing transmission of data from the terminal apparatus to the one of the connection apparatuses selected, wherein said selecting step also determines when a packet is received from the terminal apparatus, the packet inquiring the data link layer address of a connection apparatus, and if the network layer address contained in the packet is that of a first connection apparatus, whether the first connection apparatus satisfies a predetermined condition, based on the route information and the connection apparatus information stored during said storing step; and said routing step also returns unchanged the data link layer address of the first connection apparatus when the determination made in the selecting step was that the first connection apparatus was optimum, but otherwise changes the data link layer address to another address of the one of the connection apparatuses that is optimum as determined in the selecting step.

* * * * *